United States Patent
Wicher et al.

(10) Patent No.: US 10,377,190 B2
(45) Date of Patent: Aug. 13, 2019

(54) TIRE PRESSURE MONITORING SENSOR ENABLING FAST CONFIGURATION AND SOFTWARE UPDATES

(71) Applicant: WEGMANN automotive GmbH, Veitshöchheim (DE)

(72) Inventors: Bartlomiej Wicher, Würzburg (DE); Andreas Riemann, Veitshöchheim (DE)

(73) Assignee: WEGMANN AUTOMOTIVE GMBH, Veitshöchheim (DE)

( * ) Notice: Subject to any disclaimer, the term of this patent is extended or adjusted under 35 U.S.C. 154(b) by 0 days.

(21) Appl. No.: 16/200,220

(22) Filed: Nov. 26, 2018

(65) Prior Publication Data

US 2019/0092105 A1   Mar. 28, 2019

Related U.S. Application Data (63) Continuation of application No. PCT/EP2017/062682, filed on May 24, 2017.

(30) Foreign Application Priority Data

May 27, 2016 (EP) .................................. 16171701

(51) Int. Cl.
*B60C 23/04* (2006.01)

(52) U.S. Cl.
CPC ...... *B60C 23/0454* (2013.01); *B60C 23/0416* (2013.01); *B60C 23/0455* (2013.01); *B60C 23/0462* (2013.01); *B60C 23/0471* (2013.01)

(58) Field of Classification Search
CPC ..... B60C 23/0454; B60C 23/00; B60C 23/02; B60C 23/04; B60C 23/0416; B60C 23/0455; B60C 23/0471; B60C 23/0462
USPC ....... 340/442, 445, 447, 449; 73/146, 146.2; 116/34 R
See application file for complete search history.

(56) References Cited

U.S. PATENT DOCUMENTS

| | | | |
|---|---|---|---|
| 7,124,002 B2* | 10/2006 | Yamamoto ........... | B60C 23/0408 701/33.2 |
| 8,742,914 B2* | 6/2014 | Deniau ................ | B60C 23/0462 340/442 |
| 9,296,265 B2* | 3/2016 | Kessler .................... | B60C 23/04 |
| 2002/0074145 A1 | 6/2002 | Hardman et al. | |
| 2015/0015390 A1* | 1/2015 | McIntyre ............ | B60C 23/0471 340/447 |

\* cited by examiner

*Primary Examiner* — Hung T Nguyen
(74) *Attorney, Agent, or Firm* — Yakov S. Sidorin; Quarles & Brady LLP (57) ABSTRACT

A wheel unit including an environmental pressure sensor, a non-volatile memory for storing a first program and a second program and configuration code, a processing unit for executing the programs, a communication module comprising a wireless transmitter for transmitting at least one parameter indicative of conditions within a tire and a wireless or wired receiver for loading the second program into the non-volatile memory and a battery for powering the wheel unit. The second program may be loaded to the memory by the first program and configured by the configuration code to operate within a specific TPM system.

15 Claims, 5 Drawing Sheets

TIRE PRESSURE MONITORING SENSOR ENABLING FAST CONFIGURATION AND SOFTWARE UPDATES

CROSS-REFERENCE TO RELATED APPLICATIONS

This application is a continuation of the pending International Application No. PCT/EP2017/062682 filed on May 24, 2017, which designates the United States and claims priority from the European Application No. 16171701.2 filed on May 27, 2016. The disclosure of each of the above-identified patent applications is incorporated herein by reference.

BACKGROUND

1. Field of the Invention

The invention relates to tire pressure monitoring sensors (herein referred to, interchangeably, as wheel units) for vehicles and, more particularly, to universal tire pressure monitoring sensors which are configurable to fit a variety of vehicles.

2. Description of Relevant Art

A tire-pressure monitoring system (TPMS, or TMP system) is an electronic system for monitoring the air pressure inside a pneumatic tire on various types of vehicles. A TPMS reports in near real-time the tire-pressure information to the vehicle's control system and to the driver. The TPMS mentioned and discussed in this disclosure are direct TPMS, which use sensors mounted inside a tire (such sensors are referred to as wheel units) and configured to measure the pressure of gasses within the tire.

A given wheel unit communicates with the vehicle's control module with the use of wireless signals, which are typically radio frequency (RF) signals. These signals contain the wheel unit pressure information and, possibly, other data such as data representing temperature, wheel unit identification number, or wheel location information. Moreover, an external programming unit may be employed to communicate with the wheel units of a vehicle, typically with the use of low frequency (LF) radio signals or physical contacts. The inbound communication may be used by a wheel unit installer to, for example, activate the wheel unit in order to receive diagnostic information, to change the wheel unit identification number, or to modify the wheel unit to operate according to a particular TPM system specification.

The wheel units may be installed by vehicle manufacturers as OEM (Original Equipment Manufacturers) products or they may be installed in installation facilities for replacement or refurbishment purposes as an after-market (AM) solution. The wheel units may operate differently in different TPM systems, depending on a vehicle manufacturer, model, year of production, make, and TPMS manufacturer. The differences between TPM systems influence implementation of the wheel unit, for example such aspects of implementation as transitioning between different operation modes, triggering conditions for an internal program flow, learning algorithms, timing, wireless signal characteristics, communication protocol, data packet content, etc.

In order for a single wheel unit to cover most of the after-market (AM) TPM systems, these systems must be supported by the respective AM-TPMS wheel unit implementation(s), or embodiments for different car manufacturers. In order to accomplish this goal, one may either implement a multitude of wheel unit types (each configured to provide a single TPM system), or employ a universal wheel unit (which may be either used on all relevant existing vehicles directly, or be programmed/configured by an installer to support one or more TPM systems). Using a multitude of single-system wheel unit types is not desirable in practice, as such use requires the wheel unit installers to stock a multitude of wheel units. This approach results in a high initial investment for the installer and the complex supply chain, and makes the wheel unit selection time consuming. The use of a universal wheel unit seems to be a much more economical solution.

U.S. Pat. No. 7,518,495 B2 discloses a method, systems and tools for programming wheel units with a software program supporting a single TPM system. Suitable program software for the wheel unit is selected from a database. This approach is very flexible as new program implementations may be added later to the database. As the full software has to be loaded to the wheel unit, the programming times are comparatively long, as a low speed communication interface is used. This interface is normally used for transmitting wheel unit specific data and triggers by the wheel unit installers. Furthermore, the intense communication reduces the capacity of the battery built into the wheel unit. Alternatively, a wired interface may be used. Such a wired interface requires additional hardware such as drivers and electrical contacts, which make the wheel unit susceptible to electrostatic discharge (ESD) damage and corrosion at the electrical contact points. The handling of a wired interface is also more complex, because a cable has to be connected to the wheel unit prior to programming the wheel unit and disconnected after the programming has been completed.

A further TPM system which can be programmed remotely is disclosed in US 2002/0075145 A1.

U.S. Pat. No. 8,692,661 B2 discloses a universal wheel unit. Here, a plurality of selectable programs are stored in the wheel unit during production, and in order to adapt the wheel unit to a specific vehicle, the required program is selected by the wheel unit installer. This methodology allows for a very fast programming of the wheel unit, as the correct program has to be only selected. The drawback of this solution, however, is that a large number of programs have to be stored in the wheel unit, which further requires a large overhead of memory, thereby increasing the wheel unit's costs. Alternatively, the memory-limited microcontroller of the wheel unit may only be pre-configured for a selection of vehicle models or protocols, which would require keeping a large number of wheel units on stock to provide the AM coverage. A further disadvantage of this approach is that, due to fact that the programs are pre-stored, no adaption to future requirements is possible. Instead, new wheel units have to be developed when the requirements change.

US 2015/0202932 A1 discloses a wheel unit storing a basic version of a program in its memory. For configuration, selected vehicle type program parameters—and not the plurality of programs—are stored in memory. This configuration allows for a comparatively fast programming of the wheel unit, as now only the parameters have to be transmitted to the wheel unit. An adaption to future (optionally changing) requirements is only possible within the reach of the parameters. Basic new functions cannot be added.

EP 2821260 A1 discloses a method for setting up a wheel unit by deleting unnecessary encoding procedures. As initially a large number of encoding procedures has to be stored in memory, a comparatively large memory is required or, otherwise, the memory limitation of commercial microcontrollers forces a large number of wheel units to be stocked, which further increases the costs of the wheel unit. Finally, adaption of a given wheel unit to new TPM systems is not always possible, unless these new TPM system fit into the existing TPM system. Otherwise, a new wheel unit has to be released.

Whenever a new TPM system appears on a market, or an existing system is modified, or if improvement possibilities or errors are uncovered within existing wheel unit software, the software has to be updated. Some of the above-mentioned wheel units of related art relied on an external programming unit used by the AM installer to perform field updates on a wheel unit by means of wired or wireless communication. In US 2015/0202932 A1, for example, the range of field updates is limited by the underlying software system. This may require re-sending the wheel units, by the installer, back to the producer for updates. And in some cases such updates may not be practically possible due to hardware and software limitations, forcing the wheel units to be withdrawn. U.S. Pat. No. 8,692,661 B2 and EP 2 821 260 A1, on the other hand, disclose the configurations that do not permit any level of software updates, thus always requiring the wheel unit replacement. This approach is disadvantageous and onerous not only for the installers but also for the entire supply chain as well as the wheel unit producers themselves. This methodology may also require the introduction of a new version number of the wheel unit for each software update, thus practically affecting all parties involved in the wheel unit after market with extra costs, greater handling complexity, time slips, human errors, and increased return rates.

The disclosure of U.S. Pat. No. 7,518,495 B2 enables full software field updates of a wheel unit, but the loading times may be long, which makes the updates more prone to communication errors, thereby often forcing the installer to repeat the process. This problem—the problem of repetition and reiteration of unsuccessful updates—is reportedly a major problem for the installers, as it induces extra costs and delays. Moreover, the intense data transfers may consume extended amount of battery power, thereby limiting the overall wheel unit lifetime.

SUMMARY

Embodiments of the invention provide a universal TPMS wheel unit configured to require little maintenance, to allow simple handling, and to provide substantial operational flexibility as compared to units of related art. More specifically, the process of configuring the embodiment of a wheel unit to operate within a specific TPM system should be fast (a few seconds as opposed to a few minutes) and substantially error-free to simplify and accelerate the wheel unit installation, thus saving installation costs. The amount of data transferred to the wheel unit during the process of configuration should be low (for example, a few bits or Kbits) in order to minimize the impact on the battery lifetime. Moreover, the wheel unit must provide a means to perform full field updates of its software, the range of which is not limited by the software already existing on the wheel unit (the existing software) to enable the introduction of the new TPM systems support, the modification of the behavior of the existing TPM system implemented within the wheel units, as well as error fixing, optimization and possibly other modifications and/or configurations. Accordingly, the wheel units must not require a withdrawal (must not require to be withdrawn) from the installation facilities in order to implement future updates of the wheel units. Consequently, the wheel units version number does not need to be updated with each software update, thereby simplifying the handling of the unit, reducing supply-chain management costs, and making the wheel unit less prone to human errors. The wheel unit should be configurable to a large number of vehicles using different TPM systems.

In one embodiment, a TPMS wheel unit comprises at least one environmental sensing electronic component such as a pressure, acceleration or temperature sensor or electronic circuitry configured to recognize and sense at least one parameter indicative of at least one condition of or within the tire (interchangeably referred to herein as a tire condition parameter), a processing programmable circuitry (processing unit or programming unit) configured to execute a program (which may be a microcontroller, a non-volatile memory for storing at least one first program, at least one second program and at least one configuration code), and a wheel unit communication electronic module that may include a wireless transmitter, a wireless or wired receiver, or a wireless or wired transceiver configured to forward information to/from a vehicle and/or the programming unit. Such information may contain details/specifics about at least one tire condition parameter indicative of at least one condition of or within the tire (such as, for example pressure, temperature, rotation direction, the wheel unit's battery state, or some other information regarding the wheel unit state). The wheel unit preferably has a housing that may be mounted to a tire or a rim such that it is held within a tire mounted to the rim.

The first program may be a code implementing an application loader, for example a boot loader. The first program may include a first upload manager using the wheel unit communication module to receive and/or install at least one second program to the non-volatile memory using a first communication protocol. The installation of such at least one second program may include at least one of loading such program to the memory, linking the program with other software already residing in the memory (such as a system manager software, for example), and unpacking the program after it has been loaded and linked. The first communication protocol may be a system of rules that allows/implements communication between the first upload manager and a programming unit. The rules may define, for example, the radio signal frequency and/or amplitude, synchronization method, content of data packets, types of the packets, sequence of exchanging the packets, timing information of the communication and so on. The first program may provide access to the functionality of the first program (such as code or data) to other software residing within the wheel unit, for example to the second program.

The wheel units may understandably operate differently in different TPM systems, depending on a vehicle manufacturer, model, year of production, make and TPMS manufacturer. The differences between TPM systems influence the specific implementation of the wheel unit, for example: transitioning between different operation modes, triggering conditions for an internal program flow, learning algorithms, timing, wireless signal characteristics, communication protocol, data packet content, etc. The second program may be devised to configure the wheel unit to operate according to at least one TPM system based on at least one configuration code. The second program may either re-use the first upload manager and/or the first communication protocol to receive and/or install the configuration code or it may comprise the configuration code within itself. The process of installation may include at least one of the steps of loading the second program to the memory, linking the program with other software already residing in the memory (such as the first program), and unpacking the second program. The second program may also include a second upload manager using the wheel unit communication module to receive and/or install the configuration code with the use of a second communication protocol. The second communication protocol may be a system of rules that allows/enables communication between the second upload manager and a programming unit. The rules may define for example the radio signal frequency and/or amplitude, synchronization method, content of data packets, types of the packets, sequence of exchanging the packets, timing information, etc. The second program may provide access to its functionality to other software residing within the wheel unit, for example to the first program.

The configuration code may include at least one of a third program, a data structure, replacement code or instructions, and it may be used by the second program to configure at least one of the first program or, preferably, itself to operate according to requirements of at least one TPM system. The second program may be devised to perform the configuration immediately after receiving the configuration code or, alternatively, it may store the configuration code in the non-volatile memory and later use it as instructions during the operation of the wheel unit.

The content of the configuration code may be used by the second program to configure the wheel unit to operate according to the requirements of at least one TPM system using one or more methods, depending on a type of the second program. The second program may use a specific method of configuring the wheel unit. For example, the configuration code may include instructions according to which the second program deletes (erases) parts of the first program or the second program. The configuration code may also include replacement code and instructions identifying for the second program which parts of the first program or the second program to replace with the replacement code. The configuration code may also include a data structure containing the information of which one or more TPM systems to support; at least one of the first program and (preferably) the second program may contain an implementation of more than one TPM system and such program may use the data structure to determine according to which one or more of the implemented TPM systems to operate. The configuration code may also include a data structure with one or more TPM system parameters that characterize the TPM system (such as transitioning between different operation modes, triggering conditions for an internal program flow, learning algorithms, timing, wireless signal characteristics, communication protocol, data packet content, for example); the data structure is used by at least the first program or preferably the second program to configure the wheel unit to the specified TPM systems. The configuration code may also include a third program (describing a behavior of at least one TPM system) and the first program and/or the second program may contain a runtime interpreter configured to interpret the third program to cause the wheel unit operate according to the specified TPM system(s).

In another related embodiment, the wheel unit may include a system manager for general system management tasks, such as power management, task scheduling or hardware management for the wheel unit resources such as environmental sensing components, non-volatile memory, communication module, processing unit, etc. The system manager may also be configured to implement utility functions, such as timers, mathematical operators, memory manipulation, string manipulation, etc. The system manager may be configured to provide access to the specific functionality it implements to at least one of the first program and the second program.

In a further embodiment, at least one of the first program and the second program may include the system manager.

In an embodiment, at least one of the first program and the second program may modify or configure the behavior or the functionality of the system manager.

In a further embodiment, a wheel unit configuration system may include at least a wheel unit as disclosed above and a programming (electronic circuitry) unit, such programming unit further including a database that contains/stores information about vehicles and at least one of the first program, second program and the configuration code; a wired or wireless programming unit communication module to communicate with the wheel unit; and a microcontroller or a microprocessor. The wheel unit may be operated by an installer who prepares the wheel unit for use in a specific vehicle.

In an embodiment, the programming unit may be used for uploading at least one configuration code to the wheel unit in order to configure the wheel unit to operate according to the requirements of one or more TPM system.

In an embodiment, the programming unit may be used to perform a full field software update that may include uploading at least one of the first program, the second program and/or a system manager to the wheel unit in order to at least add support for a new TPM system to the wheel unit; to modify the behavior of the wheel unit for one of the TPM systems supported by the wheel unit; and to perform software error fixing and/or optimizations. In contradistinction with related art, the full field software updates eliminate the need to withdraw a sensor from the market for modifications, improvements or functionality extensions. This, in turn, simplifies handling of the wheel units, reduces supply-chain management costs, and makes the wheel unit management less prone to human errors.

In an embodiment, the programming unit may include an output device configured to provide the installer with information messages and selection of options (such as a screen or a printer, for example) and an input device configured to permit the installer to communicate his choices to the programming unit (such as a keyboard, a touch screen, a barcode scanner, and/or a camera). The programming unit input/output devices may allow the installer to select one or more target TPM system, according to which the wheel unit should operate, for example by manually entering the vehicle identification number (VIN), by reading the VIN using a barcode scanner or a camera, or by manually selecting the vehicle producer, make, model, production date, etc. The programming unit input/output devices may also enable inserting version numbers of the first and second programs and the configuration code, or inserting other information indicating such version numbers (such as a wheel unit serial number, for example) that can be used by the programming unit to find the required version numbers in its memory. In addition or alternatively, the programming unit may also acquire the version numbers directly from the wheel unit, using the wheel unit communication module. The programming unit may include an algorithm utilizing the target TPM system selection and the version numbers to automatically detect if—in order to configure the wheel unit to operate according to the target TPM system—the wheel unit requires any of the full field software update, uploading the configuration code, or to the contrary requires no additional action.

In one embodiment of the invention, the full field software update may require transferring much larger amount of data to the wheel unit than uploading the configuration code. Accordingly, the full field software update may be considerably more time-consuming than uploading the configuration code. Reportedly, uploading the configuration code may take as little as 3 seconds, compared to 30 seconds required by the full field software update.

In an embodiment, the full field software update may, by its nature, be necessary only very seldom, when configuring the wheel unit to a specific TPM system and uploading the configuration code very often. Since uploading the configuration code may be considerably less time-consuming than the full field software update, the process of configuring the wheel unit to a specific TPM system may be relatively fast in vast majority of cases. Transferring small amount of data decreases probability of communication errors, thus improving reliability of the configuration process and minimizing its impact on the wheel unit battery lifetime. Fast and reliable configuration process accelerates the wheel unit installation, thus saving installation costs.

In an embodiment, the programming unit may include a battery as an energy source. In vast majority of cases, the process of configuring the wheel unit may require uploading only the configuration code, which in turn may require transferring relatively small amount of data. Lower data transfers consume less energy, thereby prolonging the operational time of the programming unit after recharging or replacing the battery. That, in turn, simplifies handling the programming unit, resulting in time and cost savings.

In an embodiment, the full field software updates are categorized according to various levels of importance. Depending on the importance level, the programming unit may be configured to only warn the user that an update is required, or silently choose to perform the full field software update without notifying the user (for example if a selected TPM system is currently not supported by the wheel unit), or it may let the user select if an update should be performed (for example, if an update is not essential, such as in case of battery lifetime optimizations). The policy used for the notifications may be partly or fully modifiable within the programming unit, or it may be pre-determined by the programming unit producers.

In yet another embodiment, the choice of the of the second program type used in specific wheel units may be made depending on the current market situation, specific customer demands, specific vehicle demands, programming unit requirements, legal requirements and other reasons. Different types of the second programs have different properties which may prove advantageous in a given situation. Wheel units using various second programs may or may not be assigned with a different version number.

In a further embodiment, the full field software update may either include the configuration code structure to configure the wheel unit to one or more TPM systems; or the first program, second program or system manager (being a part of the full field software update) may be pre-configured to operate according to one or more TPM systems. The pre-configuration may be performed by the programming unit according to the configuration code, or it may be performed by an external tool and the pre-configured first program, second program and/or system manager stored in the database of the programming unit.

In one embodiment, at least one first program and/or second program and/or at configuration code may be installed in the wheel unit by default, during the production. The so installed codes are further referred to as a default first program, a default second program, and default configuration code. This way, the installer may not only avoid the potentially lengthy process of loading and installing the second program, but the installer may even skip the step of configuring the wheel unit to a specific target TPM system if the default configuration code supports the target TPM system. Thus, the wheel unit installation time can be significantly shortened. Preferably, the most popular TPM system should be used for the default configuration code.

In an embodiment, at least one default first program and/or the default second program and/or the default configuration code may be transferred to the wheel unit's non-volatile memory during the production using a wheel unit direct access module. The direct access module provides direct access to the wheel unit control unit and the non-volatile memory, and enables reading from and writing to the non-volatile memory without the need to use and/or without the use of the communication module. At the same time—that is, while enabling the reading and/or writing— the direct access module requires physical access to the connectors of a chip storing control unit or the non-volatile memory. That may imply that the access to the direct access module is not available after the wheel unit housing is sealed. The direct access module may provide faster data transfer rate than the wheel unit communication module, thus it may be advantageous to use the direct access module to accelerate the wheel unit production process.

In another embodiment, at least the first program, the default second program, and the default configuration code may be transferred to the wheel unit during the production using both the direct access module and the wheel unit communication module, whether simultaneously or in sequence. Using multiple methods of data transfer may be advantageous if and when the production is performed in many facilities or by many manufacturers. Preferably, a dedicated production programming unit is provided for installing the default programs during production, the unit using the direct access module or the wheel unit communication module for communication with the wheel unit.

In an embodiment, the non-volatile memory and the processing unit reside on the same chip, although they may also be located on separate chips.

In a further embodiment, the first program may be implemented as a boot loader.

In another embodiment, auxiliary data may be exchanged between the programming unit and the wheel unit. The auxiliary data may contain a wheel unit identification number, firmware updates, data reception confirmation, protocol handshakes, version numbers of software residing on the sensor, checksums or code used for invoking wheel unit producer proprietary functionality.

In another embodiment, the first and the second communication protocols may be identical.

In another embodiment, multiple second programs may be stored within the wheel unit memory to enable multiple methods of configuring the wheel unit to a specific TPM system.

In another embodiment, multiple configuration codes may be stored within the wheel unit memory, adapting the wheel unit to operate according to a multitude of TPM systems simultaneously.

In another embodiment, the second program may configure the wheel unit to operate with a multitude of TPM systems simultaneously based on a single configuration code.

In another embodiment, the first program may be modified, configured or replaced with the use of the second program to enable error fixing, improvements or other maintenance task within the first program.

BRIEF DESCRIPTION OF THE DRAWINGS

In the following, the implementation(s) of the invention will be described without limitation of the general inventive concept, on examples of embodiments and with reference to the drawings.

While embodiments of the invention are susceptible to various modifications and alternative forms, it is understood that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
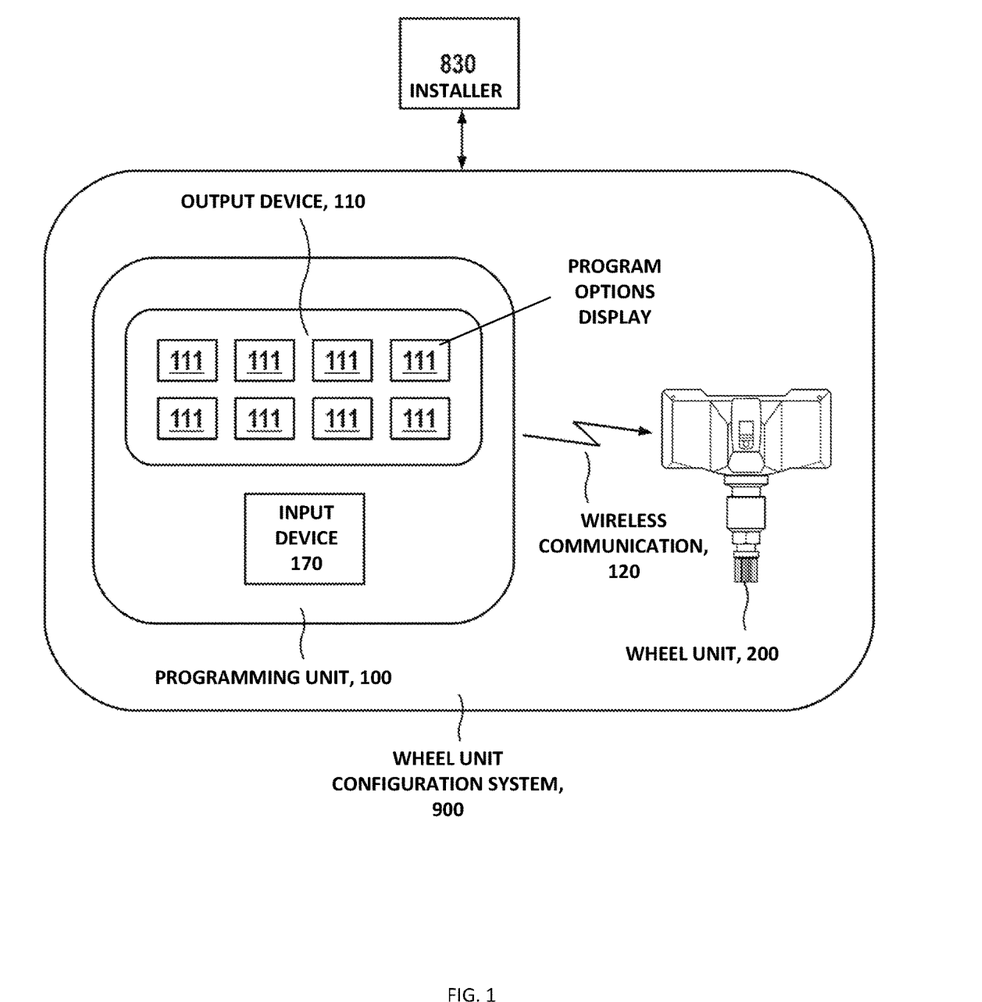
FIG. 1 shows a basic structure and usage of a wheel unit configuration system.

In FIG. 1 a basic structure and usage of a wheel unit configuration system is shown. A programming unit 100 may have an output device 110, preferably a display or a printer, and an input device 170, preferably a touch screen, a keyboard or a barcode scanner. The output device is configured to provide (present, for example by displaying to) an installer 830 with a plurality of options, for example for selecting a target vehicle within which the wheel unit must operate. The installer may communicate his options selection with the input device. The programming unit will configure the wheel unit, for example via a wireless communication interface 120, to make the wheel unit operate according a specific TPM system used by the vehicle selected by the installer.

Figure 2:
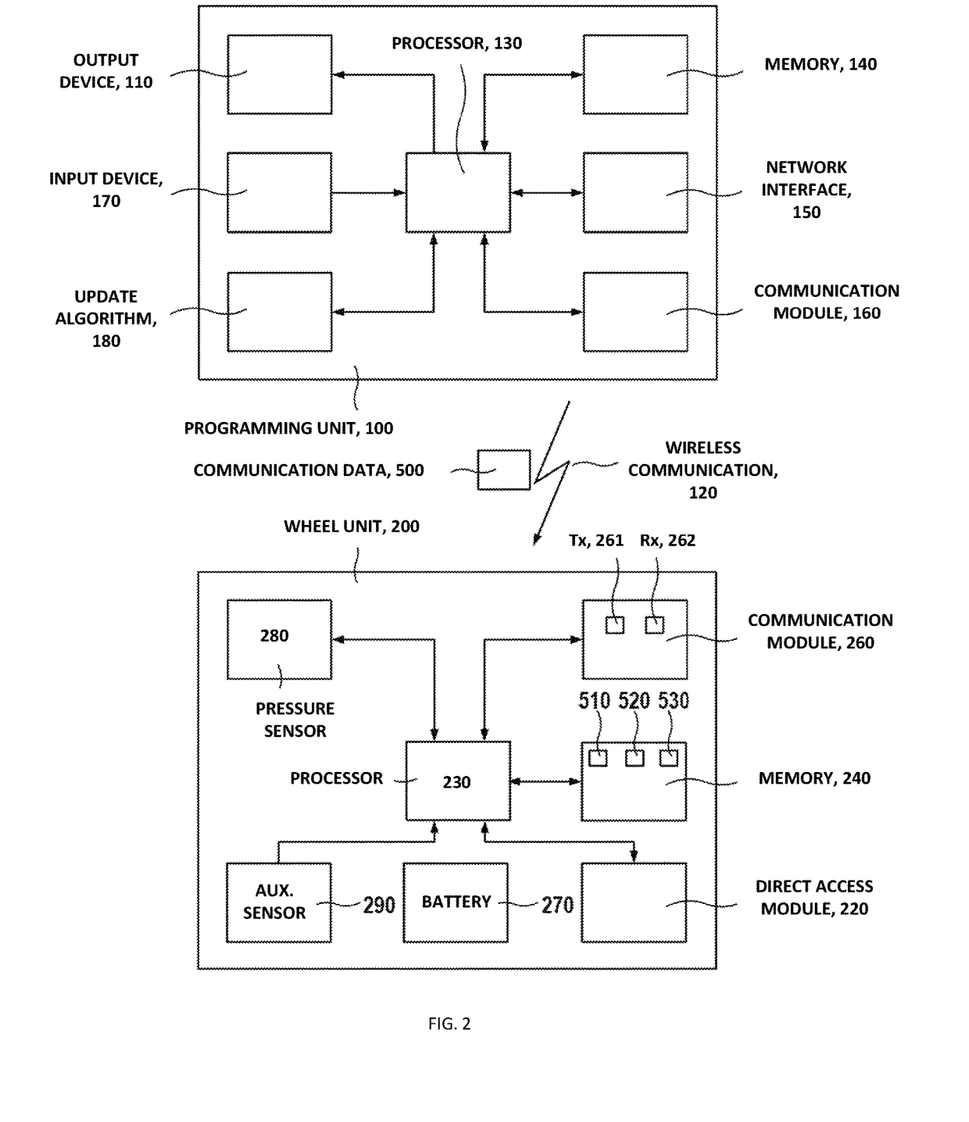
FIG. 2 illustrates details of a wheel unit configuration system.

In FIG. 2, additional details of a wheel unit configuration system are shown. The programming unit 100 preferably has a microcontroller or microprocessor 130 which is further connected to a memory 140 or storage. The memory may be organized as a database and may contain information about vehicles and wheel units. It may be any kind of RAM/ROM, a disk drive or a network connected storage. It is further preferred, if the information about vehicles comprise at least one of vehicle manufacturers, vehicle models, manufacturing years, vehicle identification number and specific TPMS requirements. The information about wheel units may include specific first programs, second programs and configuration codes. Furthermore, there may be cross links between specific vehicle manufacturers, models, years or individual vehicles and specific first programs, second programs and configuration codes. There may also be information about wheel unit hardware and software such as manufacturer, model number, manufacturing year, software version numbers and specific hardware capabilities such as processing power and memory space. The programming unit 100 may contain an update algorithm 180 to link the information about the vehicles and wheel units and other information stored within its memory to select the appropriate content of communication data 500 to be transferred to the wheel unit 200, for example via wireless communication 120. The communication data content may be further received and used by the wheel unit to configure itself for operation with a specific TPM system.

For communication with and software upload to a wheel unit, a programming unit communication module 160 may be provided. This communication module preferably is a wireless communication module, but may also be a wired communication module. Although a unique directional communication module is sufficient to upload data to the wheel unit, it is preferred to have a bidirectional communication module for transmitting data to a wheel unit and receiving information from a wheel unit. The received data may be information about the wheel unit such as manufacturer, type, manufacturing year, software version or serial number. Also a checksum or confirmation of uploaded data may be received. It is further preferred, if the programming unit has an output device 110 and input device 170, which may be controlled by the microcontroller or microprocessor 130. It is further preferred that the microcontroller/microprocessor has access to a network interface 150 which may provide a connection to an external computer, an external network, external data storage or to the Internet. This may be used for updating the database 420, downloading and/or updating information about vehicles, wheel units, the first programs, second programs and configuration codes or any software required for handling and/or compiling such information.

A wheel unit 200 preferably comprises a processing unit 230 for controlling the wheel unit together with a non-volatile memory 240. The memory preferably may be a flash, EEPROM, ROM memory or a battery powered RAM. An environmental pressure sensor 280 may be provided for monitoring the gas pressure within the tire and providing such pressure information to the processing unit. There may be also at least one auxiliary sensor 290 for measuring the wheel unit environmental conditions, such as acceleration, shock or temperature. For communication with the programming unit 100, at least one wheel unit communication module 260 may be provided comprising at least a wireless transmitter 261 and a wireless or wired receiver 262. This wheel unit communication module enables a first program 510 or a second program 520 at least to receive the communication data 500 from the programming unit 100 and store it into the memory 240. Preferably, the communication data are the first program, the second program or a configuration code 530. For powering the wheel unit 200, a battery 270 may be provided.

It is preferred that the same wheel unit communication module enables communication with a vehicle. Although the communication requirements for uploading the software from the programming unit 100 and during normal operation and tire pressure monitoring are significantly different, they may be handled by the same wheel unit communication module. The minimum requirement for data upload is the receiver 262 in the wheel unit communication module 260 to receive the first program 510, the second program 520, the configuration code 530 and the system manager 310, whereas the minimum requirement for tire pressure monitoring is the transmitter 261 for transmitting status information to a vehicle. There may be a low power transceiver for these both communication paths. There also may be a high speed high power transmitter. Of course, any further combination such as a full high-speed transceiver for software upload and a full low-power, low-speed transceiver for pressure monitoring may be provided.

Figure 3:
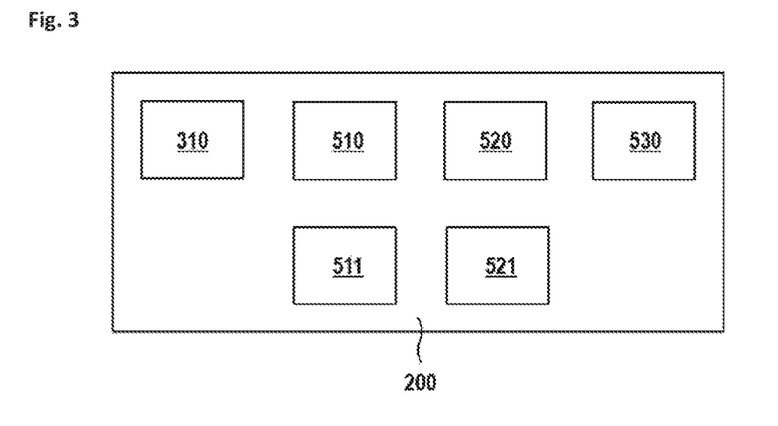
FIG. 3 depicts the logic structure of a wheel unit.

FIG. 3 shows the logic structure of a wheel unit. There may be a system manager 310 for general system management tasks, such as power management, task scheduling or hardware management for the wheel unit resources such as environmental sensing components, non-volatile memory, communication module, processing unit, etc. The system manager may also include utility functions, such as timers, mathematical operators, memory manipulation, string manipulation, etc. The system manager may provide an access to the functionality it implements to at least one of a first program or a second program. The wheel unit may also comprise a first program 510 using the first upload manager 511 to receive the second program 520 and to store it within the non-volatile memory 240. The second program may be configured to operate within a specific TPM system based on a configuration code 530, received and installed with the use of the second upload manager 521.

Figure 4:
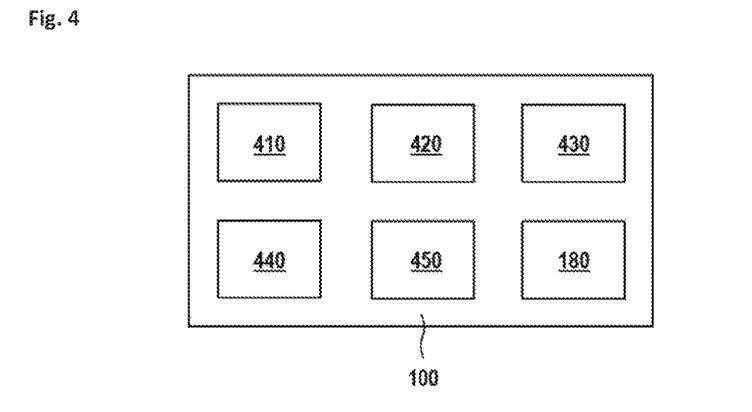
FIG. 4 shows the logic structure of a programming unit.

FIG. 4 shows the logic structure of the programming unit. It has an upload manager 410 for uploading data to a wheel unit. Furthermore, a database 420 may be provided for storing information about vehicles and/or wheel units and/or for storing related first programs, second programs, configuration codes and system managers. A user interface manager 430 may be provided to communicate with an installer 830. There may further be a network manager 440 and a TPMS receiver manager 450 and an update algorithm 180.

Figure 5:
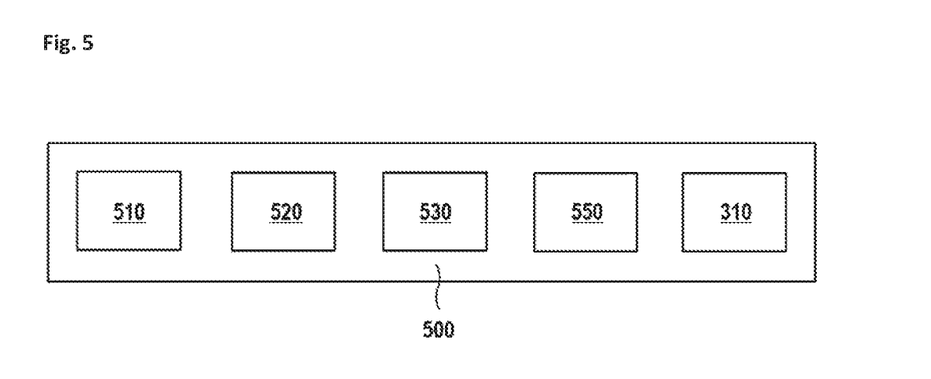
FIG. 5 shows the details of the data transmitted between the wheel unit and the programming unit.

FIG. 5 shows the data transferred between the programming unit 100 and the wheel unit 200. The data 500 may include at least one of the first program 510, the second program 520, the configuration code 530, system manager 310 or auxiliary data 550. The auxiliary data 550 may contain a wheel unit identification number, firmware updates, data reception confirmation, protocol handshakes, version numbers of software residing on the sensor, checksums or code used for invoking wheel unit producer proprietary functionality What exactly is transmitted within the communication data 500 depends on a wheel unit memory 240 content, an update algorithm 180, current point in wheel unit lifetime and possibly other factors.

Figure 6A:
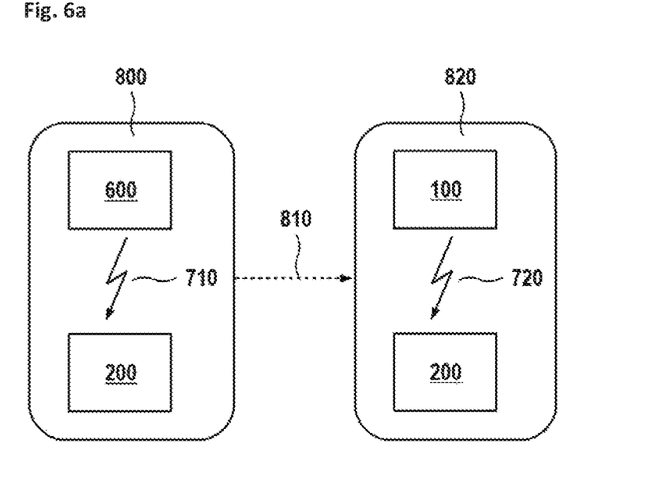
FIGS. 6*a* and 6*b* illustrate the wheel unit configuration system from the chronological and deployment perspective.
Figure 6B:
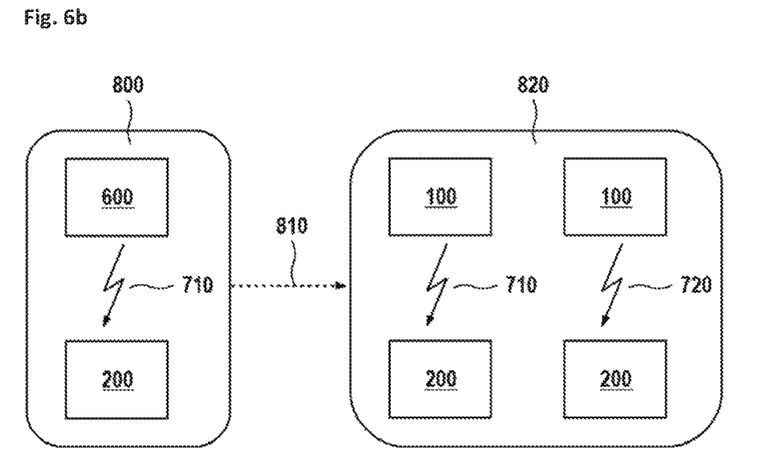

FIGS. 6a and 6b show the wheel unit configuration system from a chronological and deployment perspective.

FIG. 6a represents a first scenario, where a wheel unit 200 does not require a full field software update comprising updating a first program 510, a second program 520, a configuration code 530 or a system manager 310 residing in the non-volatile memory 240. Within the production facility 800 a first program, a system manager, a default second program and a default configuration code is loaded (710) to the wheel unit's non-volatile memory 240 with the use of a production programming unit 600. The production programming unit is preferably able to handle multiple wheel units at a time and it may use either a wheel unit communication module 260 or its direct access module 220 to write to the non-volatile memory. In another embodiment only a first program may be uploaded to the processing unit using its direct access module 220 and the second program is uploaded with the use of the wheel unit communication module 260. Any other combination is also possible. Next, the wheel unit is shipped to the installation facility 820 via its supply chain 810. At the destination the programming unit 100 is used to specify to which target TPM system the wheel unit should be configured to. The programming unit communicates with the TPMS wheel unit and it uses the information received from the wheel unit, such as version numbers of the software stored within the wheel unit, as well as its internal data base 420 to determine that the wheel unit does not require full field software update. The programming unit determines also, that the wheel unit requires installing a new configuration code. Accordingly, only the configuration code is transferred to the wheel unit (720), thus making it compatible with the required TPM system. The entire communication process is relatively fast, reportedly it lasts around 3 seconds.

FIG. 6b shows a second scenario, where the wheel unit requires the full field software update. Similarly to the process shown in FIG. 6a, the wheel unit is initialized in the production facility 800 and then it is shipped to the installation facility 820 via the supply chain 810. Similarly, the installer selects the target TPM system on the programming unit 100 and the tool determines whether the full field software update is necessary. According to the tool database the version of the second program residing in the wheel unit memory does not support the target TPM system. A newer version of the second program is uploaded to the wheel unit within the full field software update 710, the newer version supporting the target TPM system. After the upload is completed, the programming unit automatically uploads to the wheel unit the required configuration code (720) in order to make the newly uploaded second program configure the wheel unit to operate according to the target TPM system. The entire communication process is significantly longer than the process presented in FIG. 6a, reportedly it lasts around 30 s. The process presented in FIG. 6a is much more common than the process presented in FIG. 6b, since updating the second program is only required when full field software updates are necessary.

It will be appreciated to those skilled in the art having the benefit of this disclosure that this invention is believed to provide a TPM system. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 programming unit
110 output device
111 program options display
120 wireless communication
130 microcontroller/microprocessor
140 memory
150 network interface
160 programming unit communication module
170 input device
180 update algorithm
200 wheel unit
220 direct access module
230 processing unit
240 non-volatile memory
260 wheel unit communication module
261 wireless transmitter 262 wireless or wired receiver
270 battery
280 environmental pressure sensor
290 auxiliary sensor
310 system manager
410 upload manager
420 database
430 user interface manager
440 network manager
450 receiver manager
500 communication data
510 first program
511 first upload manager
520 second program
521 second upload manager
530 configuration code
550 auxiliary data
600 production programming unit
710 full field software update
720 uploading the configuration code
800 production facility
810 supply chain
820 installation facility
830 installer
900 Wheel unit configuration system

The invention claimed is:

1. A wheel unit comprising at least:
an environmental sensing component configured to measure at least one parameter indicative of at least one environmental condition within or of a tire,
a non-volatile memory configured to store a first program, a second program, and configuration code,
a processing unit configured to control the wheel unit and configured to execute at least one of the first program and the second program,
a wheel unit communication module further comprising:
a wireless transmitter configured to transmit at least tire condition related information and
a receiver configured to receive at least one of the first program, the second program, and the configuration code, the receiver being wireless or wired,
wherein the first program comprises a first upload manager operably cooperated with the wheel unit communication module to receive and load into the nonvolatile memory the second program,
wherein the second program is adapted to use the first upload manager to receive the configuration code or comprises a second upload manager to receive the configuration code, and
wherein the configuration code is adapted to provide information about at least one tire-pressure monitoring (TPM) system to the second program;
wherein the information is adapted to be used by the second program to configure the behavior of the wheel unit so as to adapt the wheel unit to operate according to requirements of the at least one TPM system.

2. The wheel unit according to claim 1, wherein the behavior of the wheel unit configured by the second program comprises at least one of
characteristics of a communication protocol used to transmit the tire condition related information,
characteristics of radio transmission used by the communication protocol,
data packets content within the communication protocol,
timing characteristics of the communication protocol,
support of wheel unit features including one or more of wheel location learning algorithms, triggering conditions for transitions between modes of the wheel unit, and timing characteristics for transitions between the modes of the wheel unit.

3. The wheel unit according to claim 1, wherein the wheel unit comprises an energy source configured to power the wheel unit.

4. The wheel unit according to claim 1, wherein the wireless transmitter is adapted to transmit information representing at least one of (i) a version of at least one of a wheel unit hardware and software, (ii) data reception confirmation, and (iii) protocol handshake while receiving with the receiver one or more of the at least one first program, the at least one second program, and the at least one configuration code.

5. The wheel unit according to claim 1, wherein the second program comprises at least one of a) default configuration code and ii) representation of configuration changes implied by the default configuration code.

6. The wheel unit according to claim 1, wherein the non-volatile memory resides in at least one of a) a processing unit of a microcontroller and b) an external chip.

7. The wheel unit according to claim 1, wherein the processing unit is programmed to execute the second program to modify, configure, or replace the first program.

8. The wheel unit according to claim 1, configured to provide access to and carry out a use of a functionality implemented by the first program by the second program and the configuration code, and further configured to provide access to and carry out the use of a functionality implemented by the second program by the first program and the configuration code.

9. The wheel unit according to claim 1, wherein the wheel unit contains a direct access module configured to provide direct access to the processing unit or the non-volatile memory, to enable reading from and writing to the non-volatile memory without a need to use the wheel unit communication module, while requiring physical access to the connectors of a chip on which the processing unit or the non-volatile memory is stored; the direct access module being used during wheel unit production to load to the non-volatile memory at least one of:
the first program,
the second program, and
the configuration code.

10. A wheel unit configuration system comprising the wheel unit according to claim 1, wherein a programming unit is provided, the programming unit further comprising:
a microcontroller or microprocessor,
a programming unit communication module,
a database containing information about vehicles and at least one of the first program, the second program, and the configuration code,
an output device configured to present, to an installer options of at least one of the selection of TPM systems, inquiry to transmitting data to the wheel unit and information messages, and
an input device configured to communicate, the programming unit, a choice made by the installer regarding the options presented by the output device.

11. The wheel unit configuration system according to claim 10, wherein the programming unit contains an update algorithm configured to determine if a wheel unit to be programmed requires an upload of any of the first program and the second program and if the wheel unit requires to be configured to requirements of a specific TPM system by uploading the configuration code to the wheel unit.

12. The wheel unit configuration system according to claim 10, wherein the microcontroller or microprocessor is configured to execute an update algorithm by using at least one of arrangements of instructions that include:
   1) a current version of the first program,
   2) a current version of the second program, and
   3) a version of the configuration code that was used by the second program to adapt the wheel unit to a specific TPM system, obtained at least by one of
   communicating said at least one of the arrangements of instructions by the installer to the programming unit with the use of the input device, and
   placing an inquiry to the wheel unit by the programming unit using the programming unit communication module.

13. The wheel unit configuration system according to claim 10, wherein the programming unit is configured to react to the output of the update algorithm by at least one of:
   a) automatically transmitting required data comprising at least one of the first program, the second program, and the configuration code selected by the update algorithm, to the wheel unit,
   b) displaying an information message to a user on the output device before said automatically transmitting the required data to the wheel unit,
   c) inquiring the user for permission to transmit the required data to the wheel unit, and
   d) transmitting no data to the wheel unit,
depending on a degree of importance of a required update and on settings of the programming unit.

14. A method for operating a wheel unit configuration system that includes a wheel unit and a programming unit, the wheel unit further comprising:
   an environmental sensing component configured to measure at least one parameter indicative of at least one environmental condition within or of a tire,
   a non-volatile memory configured to store at least one of a first program, a second program, and a configuration code,
   a programming unit configured to control the wheel unit and configured to execute at least one of the first program and the second program,
   a wheel unit communication module comprising a wireless transmitter configured to transmit at least tire condition related information, and
   a wireless or wired receiver configured to receive at least one of the first program, the second program, and the configuration code,
   the programming unit further including microcontroller or microprocessor, and a programming unit communication module,
the method including at least one of the steps of:
   loading the first program into the non-volatile memory of the wheel unit, and
   loading the second program into the non-volatile memory of the wheel unit,
   transmitting the configuration code to the wheel unit, and
   using the configuration code by the second program to configure the wheel unit to operate according to a specification of at least one tire-pressure monitoring (TPM) system.

15. The method for operating the wheel unit configuration system according to claim 14, comprising the steps of:
   selecting at least one target TPM system for the wheel unit and either
   i) choosing a set of at least one of the first program and the second program and the configuration code based on the target TPM system and software versions, and transmitting the selected data to the wheel unit,
   or
   ii) transmitting no data to the wheel unit.

* * * * *